United States Patent
Kim et al.

(10) Patent No.: US 10,255,175 B2
(45) Date of Patent: Apr. 9, 2019

(54) ELECTRONIC DEVICE AND MEMORY ALLOCATION METHOD THEREFOR

(71) Applicant: Samsung Electronics Co., Ltd., Suwon-si, Gyeonggi-do (KR)

(72) Inventors: Kwonsik Kim, Suwon-si (KR); Jihwan Park, Seoul (KR); Kibeom Kim, Seoul (KR); Hyojeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/570,047

(22) PCT Filed: May 11, 2016

(86) PCT No.: PCT/KR2016/004934
§ 371 (c)(1),
(2) Date: Oct. 27, 2017

(87) PCT Pub. No.: WO2016/182341
PCT Pub. Date: Nov. 17, 2016

(65) Prior Publication Data
US 2018/0129598 A1    May 10, 2018

(30) Foreign Application Priority Data
May 11, 2015 (KR) .......................... 10-2015-0065120

(51) Int. Cl.
*G06F 9/52* (2006.01)
*G06F 12/02* (2006.01)
(Continued)

(52) U.S. Cl.
CPC .............. *G06F 12/023* (2013.01); *G06F 1/32* (2013.01); *G06F 3/0604* (2013.01); *G06F 3/0611* (2013.01); *G06F 3/0631* (2013.01); *G06F 3/0673* (2013.01); *G06F 12/02* (2013.01); *G06F 12/08* (2013.01); *G06F 9/52* (2013.01);
(Continued)

(58) Field of Classification Search
None
See application file for complete search history.

(56) References Cited

U.S. PATENT DOCUMENTS

| 7,159,094 | B1 | 1/2007 | Cholleti et al. |
| 2004/0078381 | A1 | 4/2004 | Blandy et al. |

(Continued)

FOREIGN PATENT DOCUMENTS

| EP | 0 968 468 A1 | 1/2000 |
| KR | 10-2008-0033690 A | 4/2008 |

(Continued)

*Primary Examiner* — Brian R Peugh
(74) *Attorney, Agent, or Firm* — Jefferson IP Law, LLP

(57) ABSTRACT

An electronic device according to an embodiment of the present disclosure comprises: a memory including a plurality of pages; and a controller selecting a page area having no non-movable page from a plurality of page areas in the memory based on page state information on the plurality of page areas if a memory defragmentation request occurs when a memory allocation request is made, moving a movable page in the selected page area, and allocating the selected page area in response to the memory allocation request after the movable page has been moved. However, the present disclosure is not limited to the above embodiment, and other embodiments are possible.

15 Claims, 7 Drawing Sheets

(51) Int. Cl.
*G06F 12/08* (2016.01)
*G06F 1/32* (2019.01)
*G06F 3/06* (2006.01)

(52) U.S. Cl.
CPC ............... *G06F 2212/1024* (2013.01); *G06F 2212/1028* (2013.01); *Y02D 10/13* (2018.01)

(56) References Cited

U.S. PATENT DOCUMENTS

| | | |
|---|---|---|
| 2011/0246742 A1 | 10/2011 | Kogen et al. |
| 2013/0185337 A1 | 7/2013 | Lipcon |
| 2014/0025863 A1 | 1/2014 | Yamanaka et al. |
| 2014/0201490 A1 | 7/2014 | Yoo et al. |
| 2014/0372726 A1 | 12/2014 | Koo et al. |
| 2015/0046644 A1 | 2/2015 | Karp |

FOREIGN PATENT DOCUMENTS

| | | |
|---|---|---|
| KR | 10-2014-0093082 A | 7/2014 |
| KR | 10-2014-0146458 A | 12/2014 |
| WO | 98/43248 A1 | 10/1998 |

[710]

[720]

ELECTRONIC DEVICE AND MEMORY ALLOCATION METHOD THEREFOR

TECHNICAL FIELD

Various embodiments of the present disclosure relate to an electronic device and a memory allocation method by memory defragmentation of the electronic device.

BACKGROUND ART

As various types of personal mobile products have become widespread, an application processor (AP) embedded in mobile products has been continuously developed, and thus performance of the application processor reaches a PC level and functions thereof become more and more various. On the other hand, however, due to natures of mobile devices with restrictions of a battery, the reduction in power consumption is also becoming an increasingly important issue. In order to satisfy both high performance and low power, various methods are being applied to the AP.

Computing systems are applied to the electronic devices, including the mobile devices and include memory capable of storing data to be computed. The computing system may operate an operating system (OS) for managing the memory. For example, if tasks such as an executed application request a memory allocation to the OS, the OS allocates a free memory to the tasks. The tasks return the memory to the OS again if the use of the allocated memory is terminated.

DISCLOSURE OF INVENTION

Technical Problem

The orders in which the tasks request memory allocation to the OS and return the memory to the OS after the use of the allocated memory has been terminated are not symmetrical to each other. In particular, since the plurality of tasks are scheduled and the memory allocation and release are repeated under the multi-tasking environment, the memory may be getting more and more fragmented. If the memory fragmentation becomes severe, even if the whole free memory is sufficient, a large-sized memory cannot be allocated and the OS would perform the defragmentation. An object of the present disclosure is directed to provision of a method for solving a problem that an execution time of a memory defragmentation operation is increased due to a failure of securing a continuous free memory when an OS performs memory defragmentation.

Solution to Problem

Various embodiments of the present disclosure are directed to the provision of an electronic device, including: a memory including a plurality of pages; and a controller selecting a page area having no non-movable page from a plurality of page areas in the memory based on page state information on the plurality of page areas if a memory defragmentation request occurs when a memory allocation request is made, moving a movable page in the selected page area, and allocating the selected page area in response to the memory allocation request after the movable page has been moved.

Various embodiments of the present disclosure are directed to the provision of a memory allocation method for an electronic device, including: selecting a page area having on a non-movable page from a plurality of page areas based on page state information on the plurality of page areas within a memory, if a memory defragmentation request is made when a memory allocation request is made; moving a movable page in the selected page area; and allocating the selected page area in response to the memory allocation request, after the movable page has been moved.

Advantageous Effects of Invention

According to various embodiments of the present disclosure, the OS can consume less latency when performing the memory defragmentation.

Further, according to various embodiments of the present disclosure, it is possible to reduce the power consumed due to the memory allocation operation of the electronic device.

BEST MODE

Figure 1:
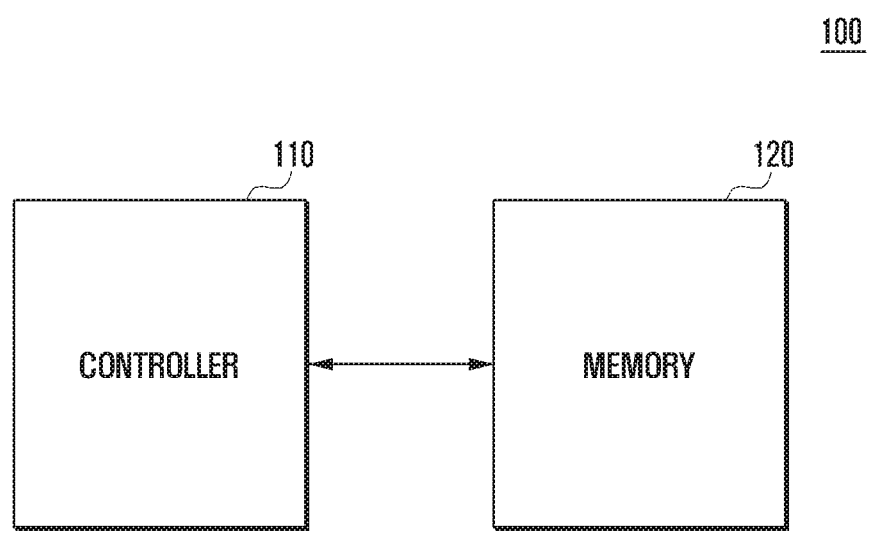
FIG. 1 is a block diagram of an electronic device according to an embodiment of the present disclosure.

Hereinafter, the present disclosure will be described in detail with reference to the accompanying drawings. The exemplary embodiments of the present disclosure may be variously changed and variously practiced, but specific exemplary embodiments are illustrated in the accompanying drawings and detailed contents thereof will be described. However, it is to be understood that the present disclosure is not limited to a specific exemplary embodiment, but includes all modifications and/or equivalents and substitutions without departing from the scope and spirit of the present disclosure. Throughout the accompanying drawings, similar components will be denoted by similar reference numerals.

The expressions such as "comprise" or "may comprise" that may be used in the present disclosure indicate the presence of the corresponding functions, operations, or components, etc., but do not limit at least one additional function, operation, or component, etc. Further, it will be further understood that the terms "comprises" or "have" used in the present disclosure, specify the presence of stated features, steps, operations, components, parts mentioned in this specification, or a combination thereof, but do not preclude the presence or addition of one or more other features, numerals, steps, operations, components, parts, or a combination thereof.

The expression such as "or" in the present disclosure includes any and all combinations of words listed together. For example, "A or B" may include A, include B, or include both of A and B.

The expressions such as "first," "second," "No. 1", "No. 2," etc. of the present disclosure can modify various elements of the present disclosure, but do not limit the corresponding constituent elements. For example, the expressions do not limit order and/or importance, or the like of the corresponding components. The expressions may be used to differentiate one component from other components. For example, both of a first user device and a second user device are user devices and represent different user devices. For example, the 'first' component may be named the 'second' component and the 'second' component may also be similarly named the 'first' component, without departing from the scope of the present disclosure.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present disclosure are used only in order to describe specific exemplary embodiments rather than limiting the present disclosure. Singular forms are intended to include plural forms unless the context clearly indicates otherwise.

Unless being defined otherwise, it is to be understood that all the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

In the present specification, an "electronic device" may include various electronic devices and mobile devices to which a computing system is applied.

In the present specification, an "available memory (e.g., free memory)" means a memory that an OS can allocate when memory allocation is requested. In contrast, a "non-available memory" means the memory that the OS can allocate when the memory allocation is requested. The "non-available memory" may include a movable memory and a non-movable memory.

FIG. 1 is a block diagram of an electronic device 100 according to an embodiment of the present disclosure.

Referring to FIG. 1, the electronic device 100 may include a controller 110 and a memory 120.

The controller 110 may drive an operating system (OS) and/or an application (APP) to control a plurality of hardware or software components connected to the controller 110, and may process and calculate various data including multimedia data.

The memory 120 may include, for example, at least one of a volatile memory (e.g., dynamic RAM (DRAM), static RAM (SRAM), synchronous dynamic RAM (SDRAM), or the like) and a nonvolatile memory (e.g. one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). The memory 120 may store commands or data which are received from the controller 110 or other components (for example, input/output interface, display, communication interface, and application control module (all of which are not illustrated)) or generated by the controller 110 or other components.

The memory 120 includes a plurality of pages. For example, the plurality of pages may include available pages (e.g., free pages) and/or non-free pages. The non-free page may include a movable page and a non-movable page. It can be understood that the terms free memory and free page described below refer to the same concept as each other. In addition, the terms memory and page can be used interchangeably.

If the system is booted for the first time, the free pages may be registered and managed as data structures that the OS manages. A physically continuous memory may be requested when the memory allocation is requested by the task (e.g., an application being executed). To this end, the OS may maintain the free memory to have the largest possible size.

If a task requests a memory allocation of an arbitrary size, the OS refers to the data structure of the free memory to allocate the free memory having a size closest to the requested size. The OS again inserts the free memory remaining after allocation into the data structure of the free memory. The task appropriately uses the allocated memory and returns the memory to the OS when the use of the allocated memory is terminated. The OS inserts the returning memory into the data structure of the free memory, and thus again allocates the memory if other tasks requests the memory later.

On the other hand, in the early time when the system was booted, most of the free memories may have the largest size that the OS may manage. However, as tasks repeatedly allocate and release memory, a fragmentation phenomenon that the memory becomes increasingly fragmented occurs. If the fragmentation phenomenon continues, the small-sized free memories may exist with scattered on memory. In this case, even if the capacity of the whole free memory is larger than the requested size, the OS cannot allocate the memory of the requested size.

Figure 2:
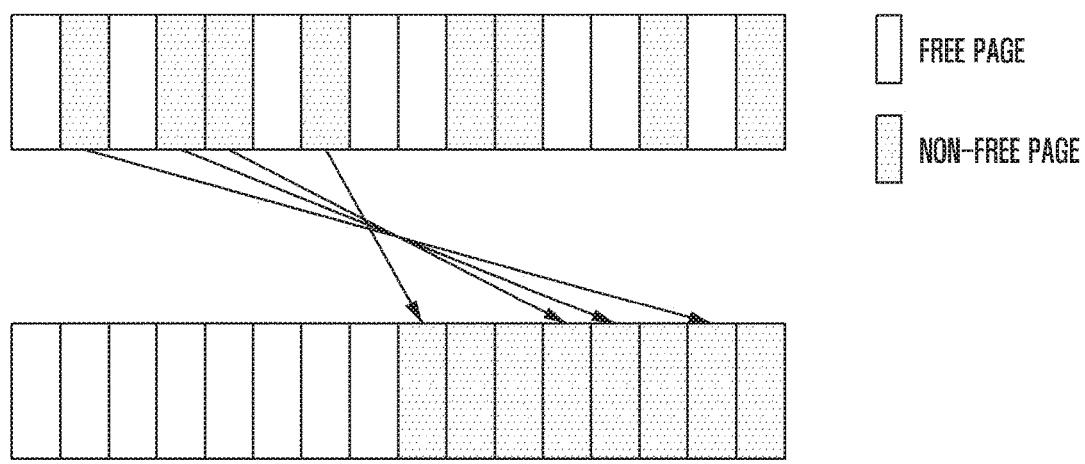
FIG. 2 illustrates a diagram for explaining memory defragmentation.

Referring to FIG. 2, the memory defragmentation aims to collect a small-sized free pages fragmented and make the free pages into a large-sized free page. That is, the OS uses a policy for allocating the requested memory by moving the movable page among the non-free pages.

Figure 3:
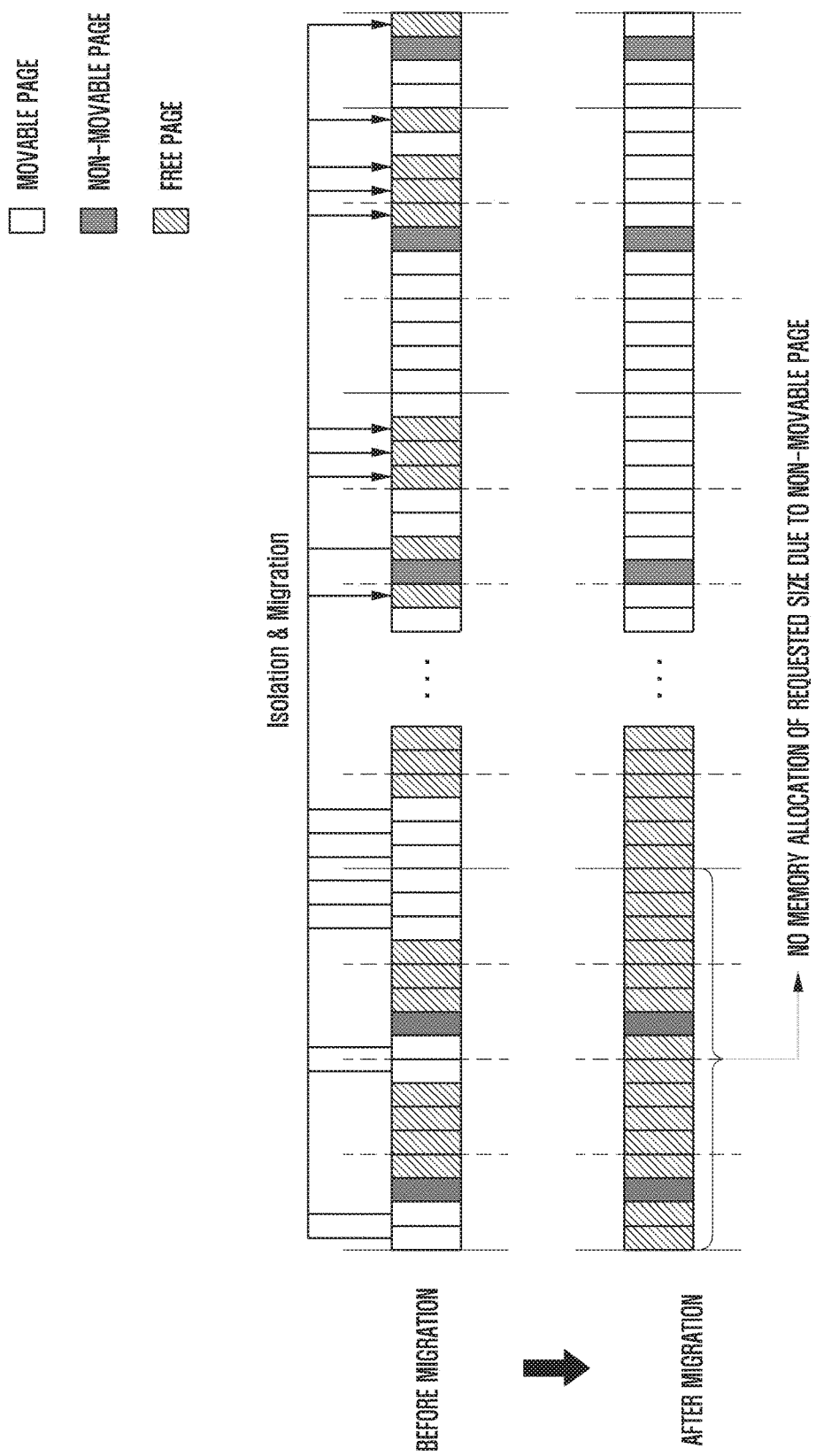
FIG. 3 illustrates a diagram for explaining a case where memory allocation is not possible by a non-movable page.

In order for the OS to allocate the memory of the requested size, all of the non-free pages should be movable in the memory of the corresponding size. However, as illustrated in FIG. 3, the non-free pages may be unmovable due to the reasons that the page is referred to by another process, the page waits for a write operation, or the like. Therefore, even if the remaining movable page is moved, it may not be possible to allocate the memory of the requested size. In this case, for example, the memory of the requested size may be found and allocated by repeating a page movement operation for a new area. However, in this case, the execution time of the memory defragmentation operation may be increased due to the repetition of the page movement operation.

According to the embodiment of the present disclosure, the controller 110 may manage page state information, which is related to at least one of non-movable page information for each page area within the memory 120, movable page information, and application number information referring to the corresponding page area, by a table. The controller 110 may select an appropriate page area based on the page state information if the memory defragmentation request is made upon a subsequent memory allocation request. For example, the controller 110 may select a page area having a non-movable page based on the page state information. The controller 10 may move the movable page in the selected page area to another area, and then allocate the memory in response to the request.

Figure 4:
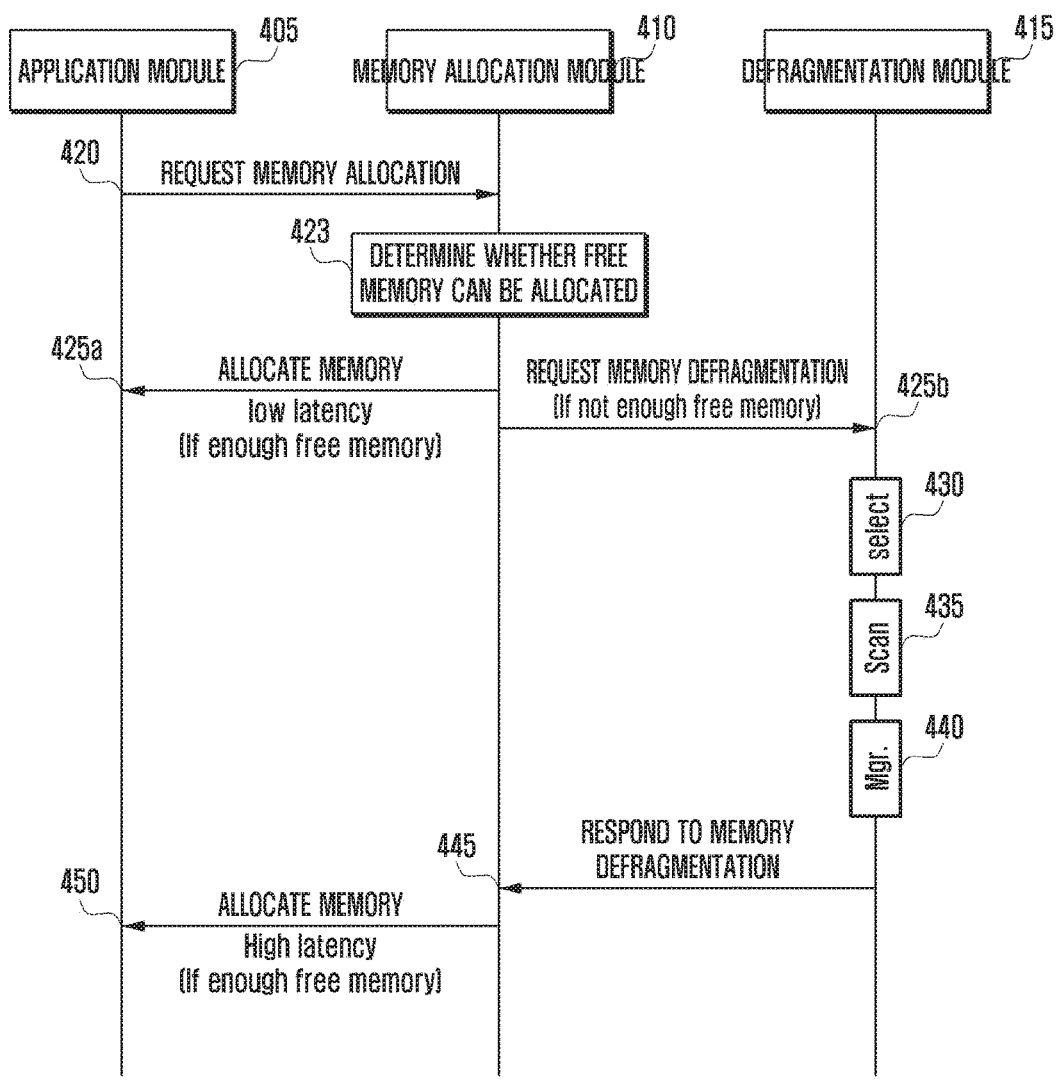
FIG. 4 is a flow chart illustrating a memory allocation operation of a controller according to an embodiment of the present disclosure.

FIG. 4 is a flow chart illustrating a memory allocation operation of a controller 110 according to an embodiment of the present disclosure.

According to the embodiment of the present disclosure, the controller 110 may include an application module 405, a memory allocation module 410, and a defragmentation module 415.

Referring to FIG. 4, in step 420, the application module 405 may request a predetermined size of continuous memory for a task to the memory allocation module 410, if necessary. In step 423, the memory allocation module 410 may determine whether the memory allocation is possible in response to the memory allocation request. For example, the memory allocation module 410 may determine whether a continuous free memory allocation of the requested size is possible.

In step 425a, if there is the corresponding free memory, the memory allocation module 410 may allocate the free memory to the task. In this case, very little latency is required for the memory allocation.

If there is no continuous free memory of the requested size, the memory allocation module 410 may request the defragmentation module 415 to perform the memory defragmentation in step 425b.

The defragmentation module 415 may manage the page state information, which is related to at least one of the non-movable page information for each page area within the memory, the movable page information, and the application number information referring to the corresponding page area, by the table. In step 430, the defragmentation module 415 may select, for example, the page area having no non-movable page satisfying a predetermined condition based on the page state information.

If the number of page areas having no the non-movable page is plural, the defragmentation module 415 may preferably select an area with the smaller number of movable pages in the page area based on the page state information. If the number of movable pages in the page area is the same, the defragmentation module 415 may allocate priority to the area with the smaller number of applications referring to the page in the corresponding page area. The defragmentation module 415 reviews the conditions to select the page area having the highest priority.

The reason for making the priority-based selection is to reduce a migration overhead. If the number of movable pages in the page area is small, the number of pages to be moved is reduced, such that the migration overhead can be reduced. The reason why priority is allocated to the smaller number of applications that refer to pages in the corresponding page area is that applications that are referring to the corresponding page should stop executing while the page is moving and wait.

The defragmentation module 415 may scan the moveable page of the selected page area in step 435 and confirm whether or not the moveable page is newly generated. Since the page is not locked, the page state may be changed (e.g., changed to the non-movable page) by other processes even while the defragmentation module 415 scans the movable page of the page area. Accordingly, the defragmentation module 415 may newly perform the step of selecting another page area (step 430) if the non-movable page is confirmed within the selected page area.

In step 440, the defragmentation module 415 may isolate the movable page and secure a free memory as many as the number of movable pages if the non-movable page is not present in the selected page area. If the free memory is secured, the movable page may be copied (e.g., moved) to the secured free memory. If the memory of the requested size is secured after the movement of the movable page has been completed, the defragmentation operation is terminated.

In step 445, the defragmentation module 415 may transmit a memory defragmentation response to the memory allocation module 410 if the defragmentation operation is terminated. Thereafter, in step 450, the memory allocation module 410 may allocate the free memory secured by the defragmentation operation in response to the memory allocation request.

Figure 5:
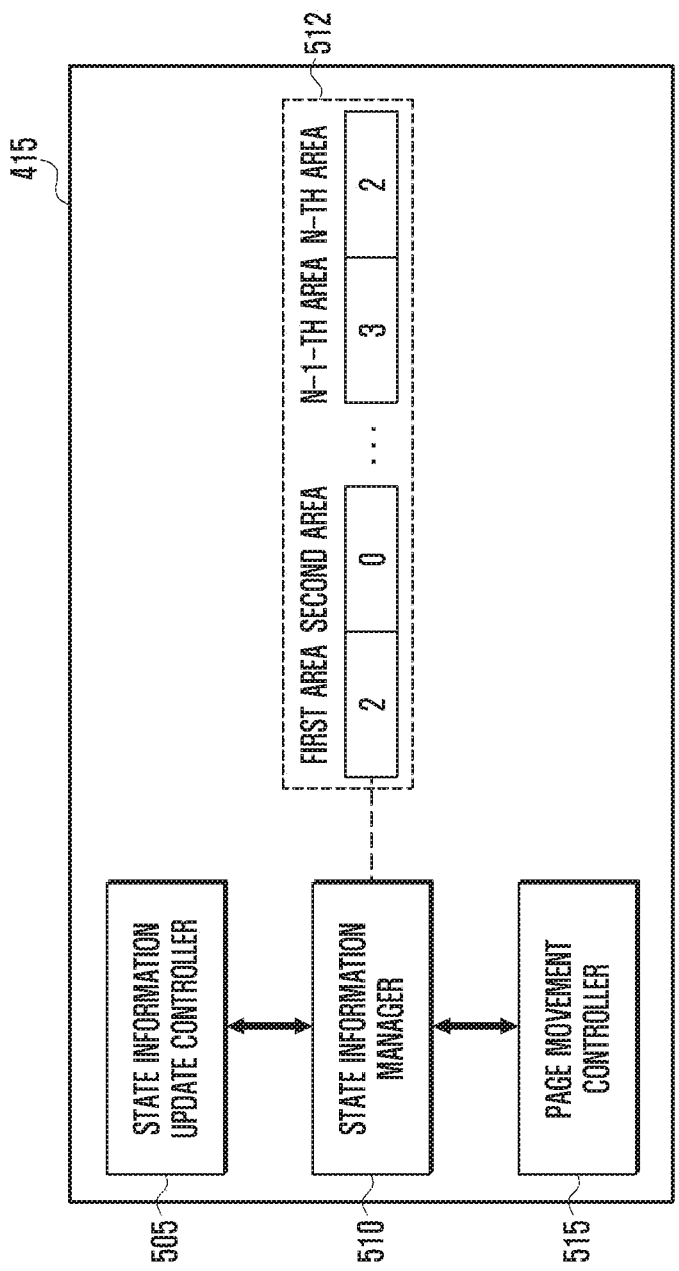
FIG. 5 is a block diagram illustrating an example of a configuration of a defragmentation module according to an embodiment of the present disclosure.

FIG. 5 is a block diagram illustrating an example of a configuration of a defragmentation module 415 according to an embodiment of the present disclosure.

For example, the defragmentation module 415 may include a state information update controller 505, a state information manager 510, and a page movement controller 515. The configuration illustrated in FIG. 5 is only an example, and a method for implementing a defragmentation module 415 according to an embodiment of the present disclosure is not limited. It may also be implemented by a hardware device, and can be implemented in several forms such as a task and a function.

The state information manager 510 may manage a data structure storing the page state information, which is related to at least one of the non-movable page information for each page area within the memory, the movable page information, and the application number information and/or list information referring to the page in the corresponding page area, by a table 512.

An example of any non-movable page may include a case where a subject referring to the corresponding page is at least two, a case where a dirty flag is set in the corresponding page, a case where a write-back for data of the corresponding page waits, or a least recently used (LRU) flag is set in the corresponding page, or the like. In addition to this, the cause of the impossibility of the page movement may be added by the concept or device added due to the update of the OS. In the present disclosure, all of the pages that cannot be moved due to various causes may be expressed by movement impossibility.

On the other hand, the number represented in the data structure storing the page state information may represent a value based on the number of pages in the page area. There may be various data structures depending on the size of the page area.

Figure 7:
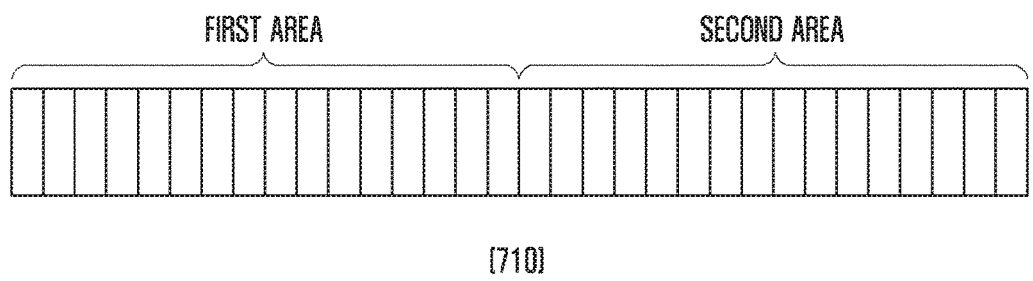
FIG. 7 is a diagram for explaining a page area corresponding to page state information managed by the controller according to the embodiment of the present disclosure.
Figure 7:
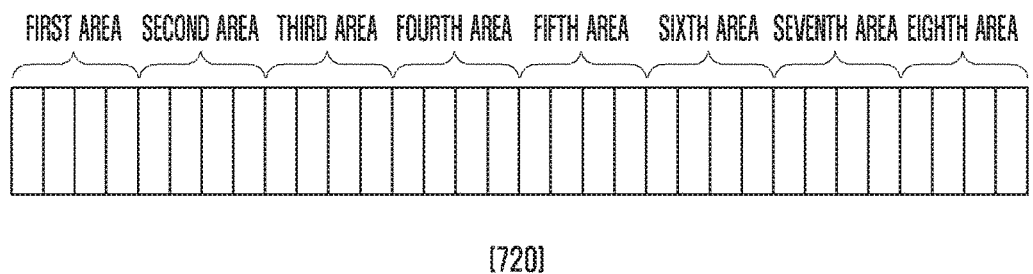

Referring to FIG. 7, it can be assumed that a data structure is configured by setting 16 pages as one page area at the beginning as in reference number 710. In this case, the number represented in one data structure is based on 16 pages. By the way, if a request is made to allocate four continuous pages in this situation, the data structure currently managed will be less accurate. Accordingly, according to one embodiment, the state information manager 510 may designate (e.g., additionally designate a page area set as four pages as in reference numeral 720) a page area of various sizes and manage a data structure storing page state information of the corresponding page area.

However, if the page area of all sizes is set and the data structure is maintained, the spatial and temporal cost for maintaining the data structure may become excessive as compared with the utility of the data structure. Therefore, according to another embodiment, the state information manager 510 can variably maintain the data structure.

For example, the data structure is configured by initially setting 16 pages as one page area as in reference numeral 710, and the size of the requested memory may continuously correspond to 4 pages. The state information manager 510 designates a new area (for example, designates a page area set as four pages as in reference number 720) for a size having a high frequency depending on the frequency of the requested memory size and calculate the data structure for the corresponding page area.

For example, the total number of data structures may be determined depending on the memory capacity of the system. The state information manager 510 can maintain a data structure for a larger size if there is a lot of space in the system memory and can maintain a limited data structure for only one or two sizes if there is no space in the system memory. In the method for determining the new page area, the requested size of the memory may vary depending on the characteristics of the system, and accordingly, the corresponding reference may also vary depending on the characteristics of the system.

The state information manager 510 can update the information stored in the data structure to the latest state, for example, under the control of the state information update controller 505.

The state information update controller 505 can update the data structure by, for example, two policies.

The state information update controller 505 can update the page state information each time the state of the page changes, by way of example. However, according to the method, power consumption may occur, and if power consumption very frequently occurs, it may be fatal to handheld devices that supply power by the battery.

For example, the data structure managed by the state information manager 510 may be updated depending on a page state update mode managed by the state information update controller 505. The page state update mode may be determined, for example, depending on the available power state of the system. The state information update controller 505 may update the data structure by instructing the state information manager 510 to perform the update each time the page state is changed if the available power is sufficient. If the available power of the system is insufficient, the state information update controller 505 may update the data structure by instructing the state information manager 510 to perform the update only when the memory defragmentation operation is generated. For example, if the available power of the system is insufficient, the state information update controller 505 may instruct the state information manager 510 to update the data structure of the page area selected in the state information manager 510 or the page area in which the number of non-movable pages is stored as 0 when the memory defragmentation operation is generated.

Upon receiving the memory defragmentation request, the page movement controller 515 may transmit the request to the state information manager 510. For example, if the state information manager 510 provides the number of movable pages and non-movable pages corresponding to the page area of the requested size and the number of applications referring to the pages in the corresponding page area or provides the selected page area, the page movement controller 515 may serve to move the movable page of the corresponding page area to the free memory of the other area and secure the free memory of the requested size.

At this time, even if the non-movable page value maintained in the state information manager 510 is 0, there may be the non-movable page in the corresponding page area. The reason is that the state information manager 510 does not set a lock on the page. While the page movement controller 515 scans the movable page for any area (e.g., the selected page area), another process can change the page state without any limitation. Accordingly, the page movement controller 515 may scan the selected page area transmitted and request the state information manager 510 to recommend another area to the state information manger 510 if discovering the non-movable page. Thereafter, the page movement controller 515 may scan the newly recommended page area and moves the discovered movable pages to secure the free memory of the requested size.

Figure 6:
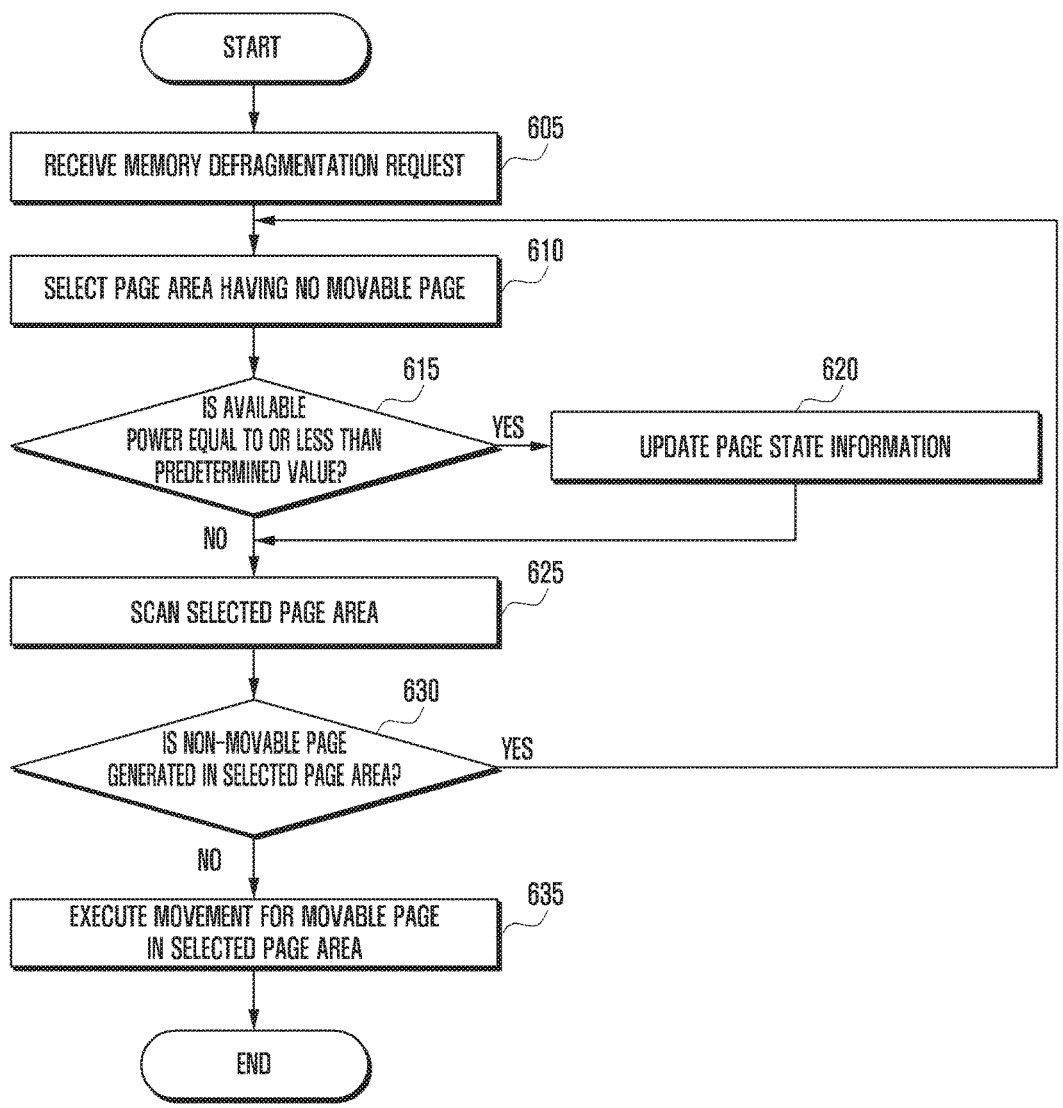
FIG. 6 is a flow chart illustrating a defragmentation operation for memory allocation of the defragmentation module according to the embodiment of the present disclosure.

FIG. 6 is a flow chart illustrating the defragmentation operation for the memory allocation of the defragmentation module 415 according to the embodiment of the present disclosure.

In step 605, the defragmentation module 415 may receive the memory defragmentation request upon the memory allocation request by the task, if necessary.

In step 610, the defragmentation module 415 may select, for example, the page area satisfying the predetermined condition, for example, the page area having no the non-movable page, based on the page state information corresponding to the plurality of page areas.

The defragmentation module 415 determines whether or not the available power of the system is equal to or less than a predetermined value in step 615, and if it is determined that the available power is equal to or less than a predetermined value, the defragmentation module 415 may update the page state information in step 620. For example, the defragmentation module 415 may update the page state information of the selected page area in step 620. Meanwhile, steps 615 and 620 are not essential steps but may be selectively performed.

The defragmentation module 415 may scan the movable pages in the selected page area in step 625. The defragmentation module 415 may detect the generation of the movable pages in the selected page area in step 630 while being scanned. If the non-movable page is confirmed, the defragmentation module 415 may again return to step 610 and select the page area satisfying the condition.

If the non-movable page is not confirmed, the defragmentation module 415 can secure the memory of the allocated size by moving the movable page in the selected page area in step 635 to a free page secured in another area.

Various embodiments of the present disclosure provide the method for reducing the execution time of the memory defragmentation operation performed if a high-order memory allocation request is made in the condition where memory fragmentation occurs.

According to the present disclosure, it is possible to reduce the page scan time to find the page to be moved when the memory defragmentation operation is performed, and effectively reduce the number of pages to be actually moved by selecting the page to be moved based on the stored page state information. As a result, it is possible to reduce the execution time of the memory defragmentation operation.

In the case where the number of movable pages is many when the conventional memory defragmentation operation is performed, the application requesting the defragmentation operation waits for the time when the page movement operation is completed, such that the responsiveness is degraded. Since the memory fragmentation phenomenon is severe with the passage of time after the system has been booted, as the elapsed time is increased after the system has been booted, the case which the responsiveness of the system is degraded is increased. According to various embodiments of the present disclosure, it is possible to effectively remove one cause of the application responsiveness degradation phenomenon by shortening the execution time of the memory defragmentation operation.

Meanwhile, various embodiments of the present disclosure may be applied only to the applications that generate the high-order memory allocation request. For example, such an application may be an application (e.g., a camera application) that uses an apparatus requiring the continuous memory allocation, a task that uses a direct memory access (DMA), and the like.

Also, in the case of the operation of updating the page state information according to various embodiments of the present disclosure, when the page state information is updated every time the page state is updated every time the page status is updated, it may be performed in a back-ground manner to hide the latency.

The module or the program module according to the present disclosure may include at least one of the above-mentioned components, may not include some thereof, or may further include other additional components. The operation performed by the module, the programming module, or other components according to the present disclosure may be executed by sequential, parallel, repetitive, or heuristic method. Further, some operations may be executed in another order or omitted or other operations may be added.

The exemplary embodiments of the present disclosure disclosed in the present specification and the accompanying drawings have been provided only as specific examples in order to help understand the present disclosure and do not limit the scope of the present disclosure. Therefore, it is to be construed that in addition to the embodiments of the present disclosure, all modifications or alternations derived based on a technical spirit of the present disclosure are included in the scope of the present disclosure.

The invention claimed is:

1. An electronic device, comprising:
a memory including a plurality of pages; and
a controller selecting a page area having no non-movable page from a plurality of page areas in the memory based on page state information on the plurality of page areas if a memory defragmentation request occurs when a memory allocation request is made, moving a movable page in the selected page area, and allocating the selected page area in response to the memory allocation request after the movable page has been moved.

2. The electronic device of claim 1, wherein the page state information includes at least one of non-movable page information in a corresponding page area, movable page information, and application information referring to a page in the corresponding page area.

3. The electronic device of claim 1, wherein the controller confirms whether the non-movable page is generated in the selected page area and again selects a page area having no the non-movable page from the plurality of page areas if it is confirmed that the non-movable page is generated in the selected page area.

4. The electronic device of claim 1, wherein the controller updates the page state information every time a page state is changed or updates the page state information when the memory defragmentation request is made if available power of the electronic device is equal to or less than a predetermined value.

5. The electronic device of claim 1, wherein the controller updates the page state information for the selected page area when the memory defragmentation request is made if available power of the electronic device is equal to or less than a predetermined value.

6. The electronic device of claim 1, wherein the controller selects one of the plurality of page areas based on at least one of the number of movable pages in each page area and the number of applications referring to each page area, when the number of page areas satisfying the condition is plural.

7. The electronic device of claim 1, wherein the controller manages the page state information on a page area having a plurality of sizes and selects a page area having an appropriate size from the page areas having the plurality of sizes, based on the allocated memory size information.

8. The electronic device of claim 1, wherein the controller changes and manages the size of the page area based on a frequency of the allocated memory size.

9. A memory allocation method for an electronic device, comprising:
selecting a page area having no a non-movable page from a plurality of page areas based on page state information on the plurality of page areas within a memory, if a memory defragmentation request is made when a memory allocation request is made;
moving a movable page in the selected page area; and
allocating the selected page area in response to the memory allocation request, after the movable page has been moved.

10. The memory allocation method of claim 9, wherein the page state information includes at least one of non-movable page information in a corresponding page area, movable page information, and application information referring to a page in the corresponding page area.

11. The memory allocation method of claim 9, further comprising:
confirming whether the non-movable page is generated in the selected page area; and
again selecting a page area having no the non-movable page from the plurality of page areas if it is confirmed that the non-movable page is generated in the selected page area.

12. The memory allocation method of claim 9, further comprising at least one of:
updating the page state information every time a page state is changed;
updating the page state information when the memory defragmentation request is made if available power of the electronic device is equal to or less than a predetermined value; and
updating the page state information for the selected page area when the memory defragmentation request is made if available power of the electronic device is equal to or less than a predetermined value.

13. The memory allocation method of claim 9, wherein in the selecting of the page area, one of the plurality of page areas is selected based on at least one of the number of movable pages in each page area and the number of applications referring to each page area, when the number of page areas satisfying the condition is plural.

14. The memory allocation method of claim 9, wherein the page state information on a page area having a plurality of sizes is managed, and in the selecting of the page area, a page area having an appropriate size is selected from the page areas having the plurality of sizes, based on the allocated memory size information.

15. The memory allocation method of claim 9, wherein the size of the page area is changed and managed based on a frequency of the allocated memory size.

\* \* \* \* \*